United States Patent [19]

Nojima et al.

[11] 4,176,703

[45] Dec. 4, 1979

[54] PNEUMATIC TIRE HAVING LUG PATTERN

[75] Inventors: Hiroshi Nojima; Masahiro Nishimura, both of Kodaira, Japan

[73] Assignee: Bridgestone Tire Company Limited, Tokyo, Japan

[21] Appl. No.: 800,840

[22] Filed: May 26, 1977

[30] Foreign Application Priority Data

Jun. 9, 1976 [JP] Japan .................................. 51-66487

[51] Int. Cl.² ........................ B60C 11/00; B60C 11/06
[52] U.S. Cl. ............................. 152/209 B; 152/361 R; 152/361 DM
[58] Field of Search ........... 152/209 B, 209 A, 209 R, 152/361 R, 361 FP, 361 DM, 354, 355, 360

[56] References Cited

U.S. PATENT DOCUMENTS

| | | | |
|---|---|---|---|
| 2,786,507 | 3/1957 | Howe et al. | 152/361 R |
| 3,095,026 | 6/1963 | Weber | 152/361 DM |
| 3,540,511 | 11/1970 | Mirtain | 152/361 R |
| 3,550,666 | 12/1970 | Menell | 152/354 |
| 3,796,247 | 3/1974 | Martin, Jr. | 152/361 R |
| 3,831,656 | 8/1974 | Senger et al. | 152/361 FP |
| 4,047,551 | 9/1977 | Mezzanotte | 152/361 R |

*Primary Examiner*—Trygve M. Blix
*Assistant Examiner*—Lawrence E. Williams
*Attorney, Agent, or Firm*—Sughrue, Rothwell, Mion, Zinn and Macpeak

[57] ABSTRACT

A pneumatic tire having a lug pattern is disclosed. The tire comprises a breaker composed of a plurality of plies superimposed one upon the other and each having an offset projected from the equatorial plane of the tire and a textile cord cover layer superimposed about the breaker and extending across two sidewalls. The cords of the breaker plies are disposed along two directions crossed through the textile cord cover layer at an angle of a range between 50° and 130° with respect to the axial direction of the lug.

6 Claims, 5 Drawing Figures

PNEUMATIC TIRE HAVING LUG PATTERN

This invention relates to pneumatic tires having lug patterns and more particularly to a large pneumatic tire for construction and agricultural vehicles comprising a tread portion having a lug pattern composed of lugs spaced apart from each other in the circumferential direction of the tire and symmetrically disposed along two directions crossed with each other with respect to the equatorial plane of the tire.

Heretofore it has been the common practice to shape a tire by the following successive steps. First, about a cylindrical metal former are rubberized cord sheets corresponding to a carcass ply and a breaker ply are superimposed one upon the other and these rubberized cord sheets are bonded together. Secondly, about the center of the rubberized cord sheets a thick tread rubber having a substantially uniform is superimposed and about the both sides thereof are superimposed side rubbers each having a relatively thin thickness to provide a green tire. Third, the green tire is introduced into a metal mold provided therein with depressions whose transverse section corresponds to that of the tread pattern of the tire. Finally, the assembly is heated under pressure so as to effectuate the final molding operation. In this case, in order to provide the tread pattern of the tire, the coated rubber of the green tire having a smooth surface is forced to flow into the depressions in the metal mold. As a result, in a tire such as a large pneumatic tire for construction and agricultural vehicles having high lugs projected from the tread surface, a large amount of rubber will flow into the deep depressions in the metal mold. In this case, with the breaker superimposed about the carcass, the ends of the breaker are susceptible to the influence of the flow movement of the tread rubber.

If the breaker is subjected to the influence of the flow of rubber, that portion of the breaker ply which is located beneath the outside region of the lug is separated from its position in close contact with the carcass. At the same time, that portion of the cords of the breaker ply which is located beneath the outside region of the lug becomes disturbed. As a result, contrary to expectations, it is impossible to obtain the reinforcing effect of the breaker at the both ends of the tread. This is most important for obtaining durability of the tire.

Such separation of the breaker ply and disturbance of the cords thereof frequently occur at portions where the axial direction of the lugs inclined at a given angle with respect to the circumferential direction of the tire coincides with the direction of the breaker cords inclined at a given angle with the circumferential direction of the tire. In order to prevent such separation of the breaker ply and cord disturbance thereof, tires having two different constructions have been proposed. In the first construction, the outermost ply of the breaker is formed of a metal cord layer composed of 2 plies disposed along two directions crossed with the lugs of the tread portion and extending from the two bead portions to the tread portion, the upper ends of plies abutting with each other at the tread center.

In the second construction tire, an additional reinforcing layer whose cords are disposed along a direction crossed with respect to the axial direction the lugs is locally superimposed about that side of the outermost ply of the breaker at which the cords of the outermost ply of the breaker are disposed along the same direction as the direction of the lugs.

These tire constructions are excellent conceptually. But, in the first construction, the tire as a whole is covered with a metal cord layer having an extremely high rigidity. As a result, the sidewalls required to be flexible, become more solid thus losing riding comfort. In addition, a separation failure may be induced between the end position of the metal cord and the rubber coated thereon.

In the second construction tire, the additional reinforcing layer whose cords are disposed along the direction crossed at right angles with the lugs is locally superimposed about the outermost ply of the breaker, so that such tire construction is not sufficient prevent the separation of the breaker ply and disturbance of the breaker cords.

An object of the invention, therefore, is to provide a pneumatic tire having a lug pattern which is novel in construction and which can obviate the above mentioned disadvantages which have been encountered with the prior art tire constructions.

A feature of the invention is the provision of a pneumatic tire having a lug pattern comprising a pair of bead portions, a carcass extending across the two bead portions, a breaker superimposed about the carcass, a tread portion extending though sidewalls across the bead portions and having a lug pattern composed of lugs spaced apart from each other in the circumferential direction of the tire and symmetrically disposed along two directions crossed with each other with respect to the equatorial plane of the tire, the improvement comprising a breaker composed of a plurality of plies superimposed one upon the other and each having an offset projected from the equatorial plane of the tire and a textile cord cover layer superimposed about said breaker and extending across the two sidewalls, the cords of said breaker plies being disposed along two directions crossed through said textile cord cover layer at an angle of a range between 50° and 130° with respect to the axial direction of said lug.

The invention will now be described in greater detail with reference to the accompanying drawings, wherein.

Figure 1:
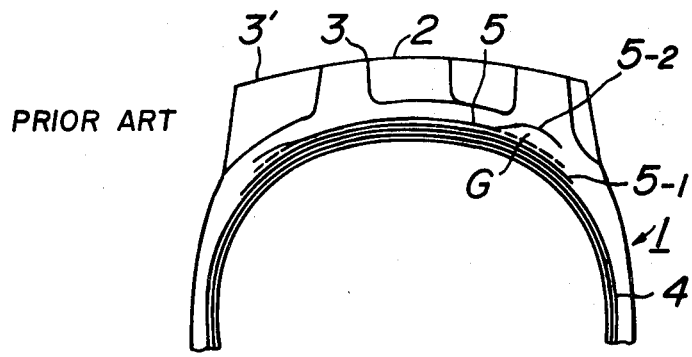
FIG. 1 is a diagrammatic transverse section through a prior art lug pattern tire showing a breaker ply separated from an underlying breaker ply and a cord disturbance thereof.

Referring to FIG. 1 showing a conventional lug pattern tire, reference numeral 1 designates a tire, 2 a tread portion, 3 a lug, 3' an outside region of the lug 3, 4 a carcass and 5 a breaker superimposed about the carcass 4 and composed of two plies 5-1 and 5-2.

As described above, when the green tire is introduced into the metal mold and the coated rubber of the green tire is forced to flow into the depressions in the metal mold, the breaker 5 is subjected to the influence of the flow movement of rubber. As a result, the upper breaker ply 5-2 located beneath the outside region 3' of the lug 3 is separated from the underlying breaker ply 5-1, element G. At the same time, the cords at that portion of the breaker ply become disturbed. Such separation of the breaker ply and disturbance of the cords impede the expected reinforcing effect of the breaker 5 required at the ends thereof for the purpose of making the tire 1 highly durable and exhibiting life.

Figure 2:
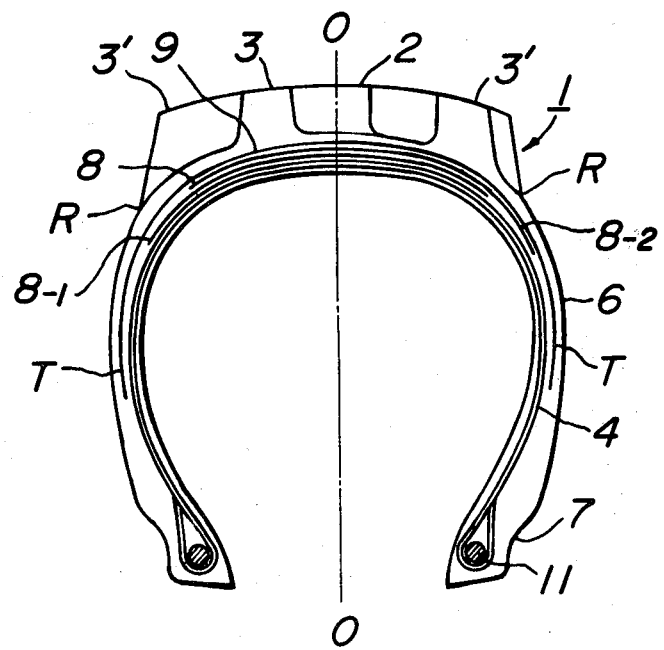
FIG. 2 is a diagrammatic transverse section through one embodiment of a lug pattern tire according to the invention.
Figure 3:
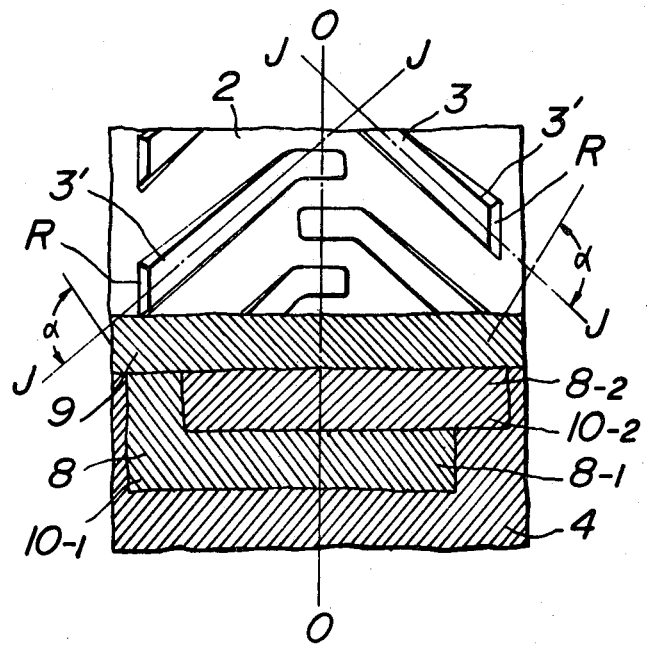
FIG. 3 is a diagrammatic plan view of a tread portion of the tire shown in FIG. 2 illustrating various layers at the tire tread portion in cross section.

FIG. 2 shows a diagrammatic transverse section through one embodiment of a tire according to the invention and in FIG. 3 is shown a diagrammatic plan view of the tread portion of the tire shown in FIG. 2.

In the embodiment shown in FIGS. 2 and 3, a tire 1 is provided at its center with a tread portion 2 and on the surface, symmetrically arranged are lugs 3 with respect to the equatorial plane 0—0 of the tire. The lugs 3 are spaced apart from each other in the circumferential direction and arranged in two rows in left and right sides of the equatorial plane 0—0 of the tire and inclined in opposite directions at an angle with respect to the equatorial plane 0—0 of the tire. The tread portion 2 extends through sidewalls 6 to bead portions 7. The tire 1 comprises a carcass 4 composed of 1 ply or a plurality of plies each formed of, for example, a textile cord layer the cords of which are extended across the two bead portions 7, 7 and inclined at an angle of a range between 20° and 90° with respect to the equatorial plane 0—0 of the tire, a breaker 8 superimposed about and reinforcing the tread portion of the carcass 4 and composed of a textile or metal cord layer and a cover layer 9 superimposed about the breaker 8 and continuously extending across the two sidewalls 6, 6, the cover layer 9 being composed of a textile cord layer.

In the present embodiment, the breaker 8 is composed of breaker plies 8-1 and 8-2 which are superimposed one upon the other and each of which has an offset alternately protruding from the equatorial plane 0—0 of the tire. In addition, at both the outside regions 3' of the lugs 3, the cords 10-1 and 10-2 of the breaker ply which are opposed to the lugs 3 are disposed through the textile cord cover layer 9 along two directions crossed with respect to the axial direction J-J of the lug 3 at an angle of α.

The angle α may suitably be selected in dependence with the use of tire within a range between 50° and 130°, preferably between 70° and 110°.

If the breaker plies 8-1, 8-2 whose cords 10-1, 10-2 are disposed along two directions crossed with both the outside edges 3' of the lugs 3 and extended beyond the outside roots R of the lugs 3 toward the sidewalls 6, the textile cord cover layer 9 functions to urge the breaker plies 8-1, 8-2 against the carcass 4 in a more efficient manner, thereby obtaining good results.

As shown in FIG. 2, in the present embodiment, each of the ends of the textile cord cover layer 9 is located at a position which is slightly beyond the maximum width position T of the sidewalls 6. Alternatively, each of the ends of the textile cord cover layer 9 may extend upto the bead portion 7 and wound around a bead wire 11 from the inside toward the outside thereof.

Experimental tests have shown that as a reinforcing material for the textile cord cover layer 9, any textile cord such as a rayon, polyester, nylon, vinylon cord, etc. may be used, and that such reinforcing material may suitably be selected and extended over such a range inclusive of the both sides of the equatorial plane 0—0 of the tire that does not hinder the manufacture of the tire.

Figure 4:
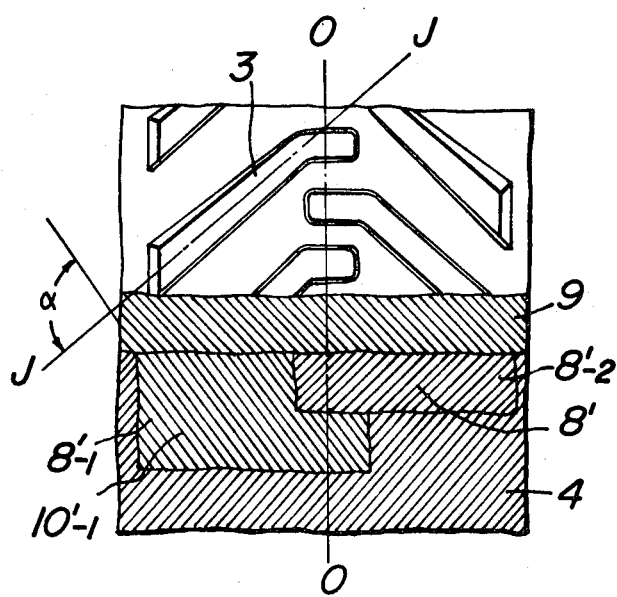
FIG. 4 is a diagrammatic plan view of the tread portion of another embodiment of the lug pattern tire according to the invention illustrating various layers at the tire tread portion in cross section.

FIG. 4 shows a diagrammatic plan view of the tread portion of another embodiment of the tire according to the invention.

In the present embodiment, use is made of breaker plies 8'-1, 8'-2 each having a relatively narrow width and a large offset projected from the equatorial plane 0—0 of the tire. These two features of the present embodiment are different from those of the previous embodiment.

As described above, if there is a large amount of offset, a region in which the axial direction J—J of the lug 3 is crossed through the cover layer 9 with cords 10'-1 of the breaker 8'-1 at and angle α becomes broader. As a result, the present embodiment is particularly applicable to an efficient extra high lug tire.

In the embodiments shown in FIGS. 3 and 4, the breaker ply is composed of 2 cord layers. Alternatively, use may be made of 3 cord layers and the innermost cord layer may be arranged without offsetting from the equatorial plane of the tire. In this case, the same effect as above may also be obtained.

In order to ascertain the improved effect of the tire according to the invention, a sample tire having a size of 23.1-34 and constructed according to the invention and another sample tire having the same size of 23.1-34 and constructed according to the prior technique were manufactured. Separation of the breaker cord layers of both the two sample tires due to undulation of the cords and breakage of the tire were measured by an X-ray photograph.

In the present test, the following three kinds of sample tires A, B and C were manufactured. The sample tire A comprises a carcass composed of 10 plies of nylon cord layer disposed along two directions crossed at an angle of 35° with respect to the equatorial plane of the tire, a breaker composed of 2 reinforcing steel cord layers which are the same in width and superimposed about the carcass, ¾ of the width thereof being superimposed at the center portion one upon the other and ¼ of the width being offset and the breaker as a whole covering the tread, and 1 textile cord cover layer superimposed about the breaker and formed of nylon, the cover layer extending downwardly slightly beyond the maximum width position T (FIG. 2) of the curved sidewalls toward the bead portion. The sample tire B is the same in construction as the tire A except the cover layer has its end extending downwardly to a position near the lower end of the bead portion. The sample tire C is of conventional construction as in the case of the sample tire A, except use is made of two breaker plies having the same width and arranged without offsetting from the equatorial plane of the tire. The sample tire C is not provided with the cover layer.

In all of the sample tires A, B and C, the lugs are disposed along the axial direction J—J inclined at 40° with respect to the equatorial plane 0—0 of the tire.

The breaker cord angle of the sample tires A and C is 25° and the breaker cord angle of the sample tire B is 40° with respect to the equatorial plane 0—0 of the tire. As a result, the breaker cord angle α to the axial direction J—J of the lug is 115° for the sample tires A and C and 100° for the sample tire B. In the sample tires A and B, the cords of the textile cord cover layer and the carcass cords are disposed along two directions crossed at the same angle with respect to the equatorial plane 0—0 of the tire.

The textile cord cover layer is coated with rubber having a modulus of 119 kg/cm² at 300% elongated condition and the breaker ply is coated with rubber having a modulus higher than the rubber coated to the textile cord cover layer.

The maximum separation ratio of the breaker cord layer of the sample tires A, B and C and the maximum amount of undulation of the ply thereof were measured and the result of which is shown in the following Table.

Table

| Kind of tire | A | B | C |
| --- | --- | --- | --- |
| Maximum separation ratio (%) | 59 | 17 | 263 |
| Maximum amount of undulation (mm) | 1.4 | 0.5 | 7.8 |

The term separation ratio shall be understood to mean a ratio of a distance between the centers of the cords adjacent breaker ply and carcass ply at outside root portion of the lug after separation to the same distance before separation. The term amount of undulations shall be understood to mean an amount of displacement from a normal locus to the breaker ply cord at the outside root portion of the lug as measured on an X-ray photograph.

Figure 5:
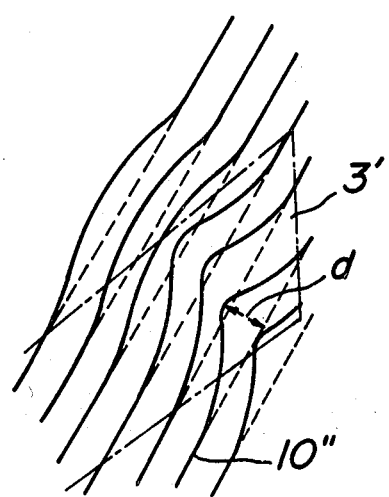
FIG. 5 is a diagram illustrating the undulations of the breaker cords.

FIG. 5 diagrammatically shows the above mentioned undulation of the breaker cord occurring at the outside root portion of the lug. The amount of undulation corresponds to a distance d between a normal locus shown by dotted lines of a breaker cord 10″ at the outside root region 3′ of the lug 3 shown by dot-dash lines and the top point of the undulation shown by full line.

As seen from the above measurement result, in the tire B according to the invention there is practically no occurrence of separation and undulation of the breaker cord. Even in tire A, the separation and undulation occurred therein are considerably smaller than those occurred in the conventional construction tire C and hence the tire A has no trouble in practice.

Particular mention must be made of the fact that, in the case of vulcanization shaping of the tire, the textile cord cover layer is subjected to flow of a large amount of rubber at the tread portion, and that the synergetic effect of the breaker and lug arrangement functions to prevent both the separation and the undulation of breaker cords deviated from the desired position.

As stated hereinbefore, the invention is capable of efficiently avoiding the separation and undulation of the breaker ply caused by the rubber flow in the pneumatic tire having the lug pattern without accompanied by the disadvantage, thereby significantly improving the quality stability and durability of the tire.

What is claimed is:

1. A pneumatic tire having a lug pattern comprising a pair of bead portions, sidewalls joined to said bead portions, a carcass extending from one bead portion to the other, a breaker composed of at least two plies arranged by cords parallel to one another in each ply and disposed between said carcass and a tread portion, tread portion being disposed between said sidewalls and having a lug pattern composed of lugs spaced apart from each other in the circumferential direction of the tire and symmetrically disposed along two directions crossed with each other with respect to the equatorial plane of the tire, the improvement comprising; a textile cord cover layer superimposed around said breaker, said cover layer having side ends extending to each of the side walls, each ply of the breaker having an offset projected from the equatorial plane of the tire so that outer regions of one of the breaker plies and said lugs face each other, the cords of said breaker plies being continuous and being arranged along two directions crossed through said cover layer at an angle of a range between 50° and 130° with respect to the axial direction of said lug, and the outer ends of each of said breaker plies terminating within said sidewalls above said bead portions outside the region of said tread portion.

2. The pneumatic tire according to claim 1, wherein the side end of said breaker extends beyond the outside root of said lug toward the sidewall.

3. The pneumatic tire according to claim 1, wherein the reinforcing material of said breaker ply is formed of a metal cord.

4. The pneumatic tire according to claim 1, wherein the reinforcing material of said breaker ply is formed of a textile cord.

5. The pneumatic tire according to claim 1, wherein said textile cord cover layer is continuously extends beyond the maximum width position of the sidewalls toward the bead portion.

6. The pneumatic tire according to claim 1, wherein the cords of said breaker ply are disposed along two directions crossed at an angle of a range between 70° and 110° with respect to the axial direction of said lugs.

* * * * *